(12) United States Patent
Dudar

(10) Patent No.: US 9,470,033 B1
(45) Date of Patent: Oct. 18, 2016

(54) SYSTEM AND METHOD FOR CONTROLLING VEHICLE ACCESS COMPONENT

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/733,986

(22) Filed: Jun. 9, 2015

(51) Int. Cl.
*B60J 5/00* (2006.01)
*E05B 17/00* (2006.01)
*E05F 15/73* (2015.01)
*B60J 5/10* (2006.01)

(52) U.S. Cl.
CPC ............... *E05F 15/73* (2015.01); *B60J 5/102* (2013.01); *E05F 2015/763* (2015.01); *E05F 2015/765* (2015.01); *E05F 2015/767* (2015.01)

(58) Field of Classification Search
CPC combination set(s) only.
See application file for complete search history.

(56) References Cited

U.S. PATENT DOCUMENTS

| 8,688,325 | B2 | 4/2014 | Wolf et al. | |
|---|---|---|---|---|
| 8,717,429 | B2* | 5/2014 | Giraud | E05B 81/78 348/77 |
| 8,874,324 | B2 | 10/2014 | Eggers et al. | |
| 2013/0155237 | A1* | 6/2013 | Paek | G06F 1/1632 348/148 |
| 2014/0156112 | A1 | 6/2014 | Lee | |
| 2015/0329088 | A1* | 11/2015 | Krajisnik | B60S 1/56 134/18 |

FOREIGN PATENT DOCUMENTS

DE 2012012664 A1 12/2013

OTHER PUBLICATIONS

2013 Ford Escape Brochure, © 2012 Ford Motor Company (13ESCWEBPDF), 24 pages.

* cited by examiner

*Primary Examiner* — Yonel Beaulieu
(74) *Attorney, Agent, or Firm* — Frank A. MacKenzie; Beijin Bieneman PLC

(57) ABSTRACT

A vehicle system includes a computer in a vehicle, and the computer includes a processor and a memory. The computer is configured to determine that a user is located within an operating region for an access component of the vehicle, collect image data of an object in a gesture path for the access component, compare the object image data to activating gesture parameters, and operate the access component when the comparison identifies an activating gesture.

19 Claims, 3 Drawing Sheets

SYSTEM AND METHOD FOR CONTROLLING VEHICLE ACCESS COMPONENT

BACKGROUND

Modern mass-market passenger vehicles may include a variety of access components that may be manually operated or power-operated, such as doors and liftgates. Moreover, power-operated components may be controlled or activated in a variety of ways, including in-vehicle controls, wireless controls, sensed user proximity and/or gestures, and combinations thereof. For example, certain doors, e.g. power-operated liftgate doors on versions of the Ford Escape vehicle, may be controlled via, in part, a motion sensor detects a particular gesture, e.g. a foot motion, in conjunction with a proximity sensor, such as a key fob sensor.

Such a system must be robustly designed to avoid false detection of activating triggers, e.g. accidentally activating based some other object or motion. However, intentional gestures may widely vary from person to person—e.g. as a person's foot motion may vary based on different heights, foot sizes, shoes, mobility, etc. As such, it is currently difficult for such a system to accommodate a wide range of intentional activating gestures and sufficiently discriminate that wide range of intentional activating gestures from false triggers.

DETAILED DESCRIPTION

Figure 1:
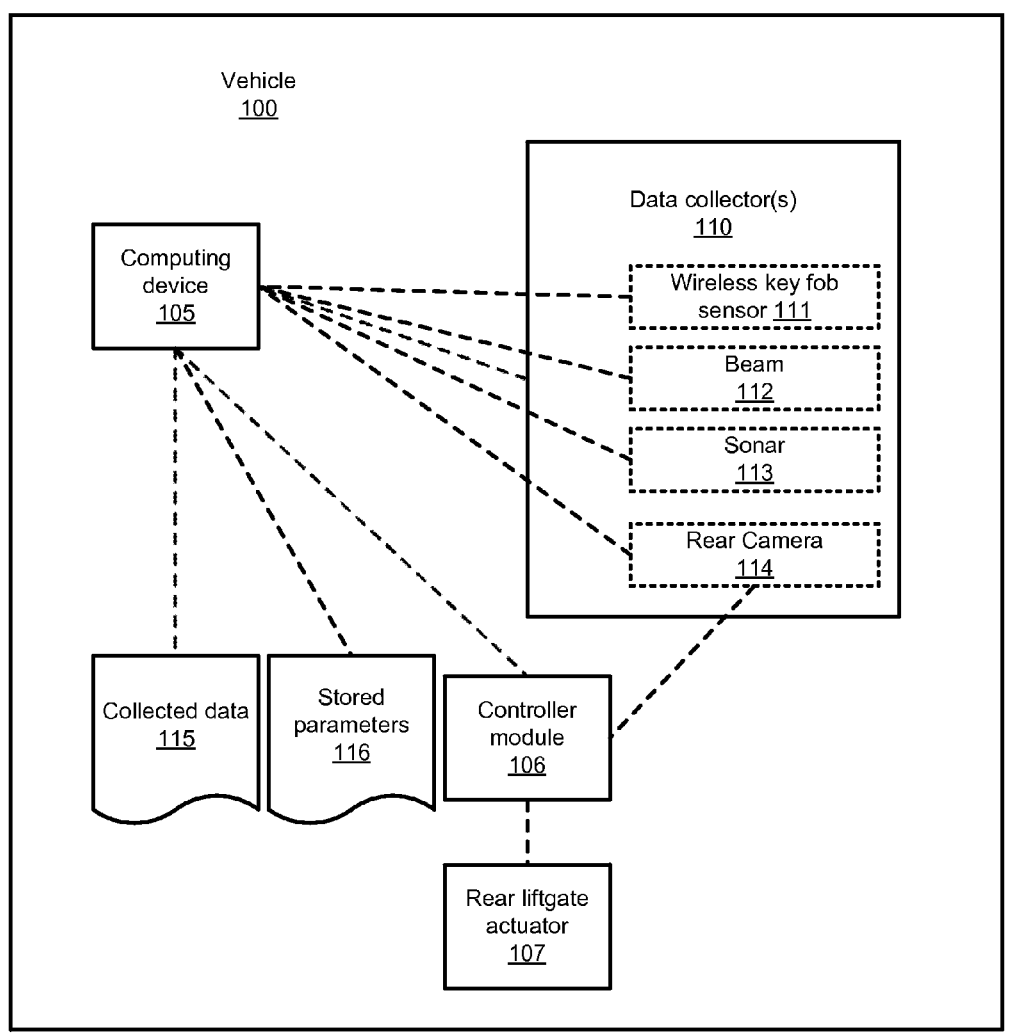
FIG. 1 illustrates an exemplary vehicle system for controlling a vehicle liftgate.
Figure 2:
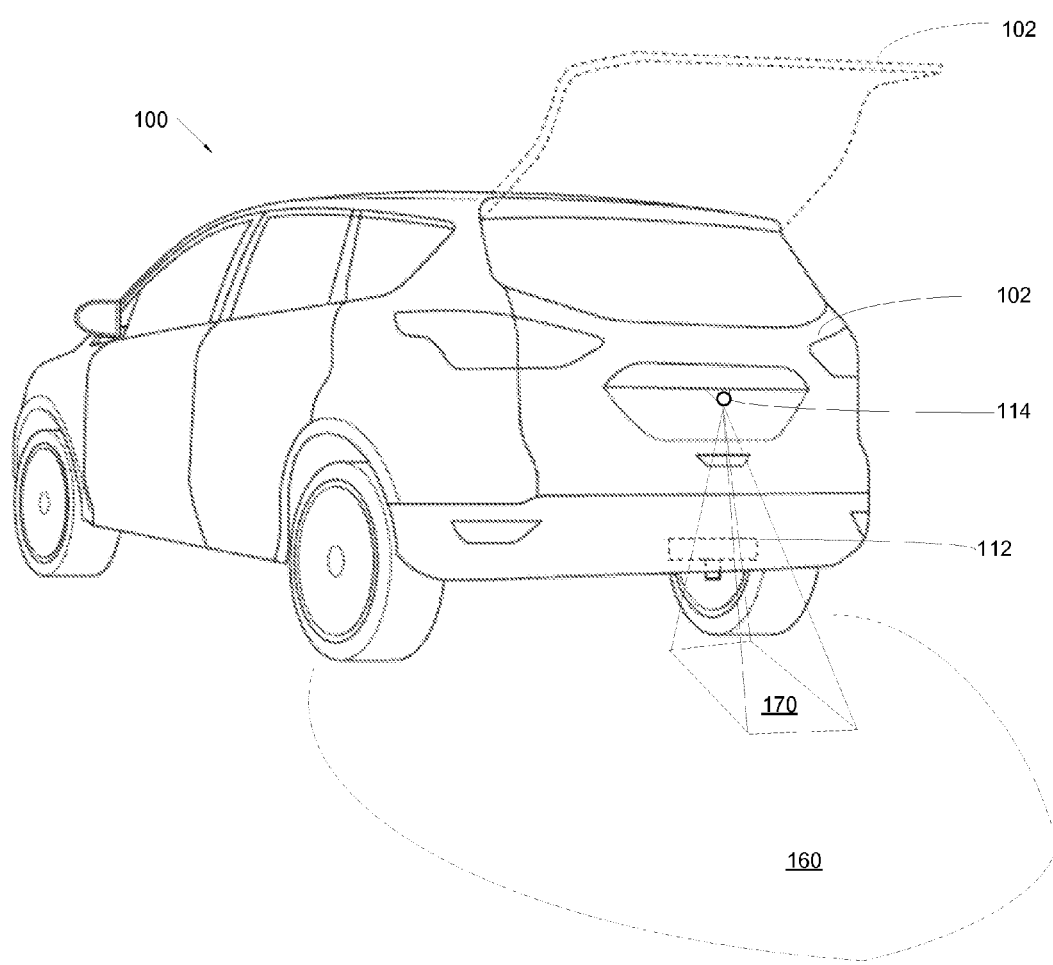
FIG. 2 is a rear perspective view of an exemplary vehicle having a vehicle system for controlling the liftgate according to the principles of the present disclosure.

FIG. 1 schematically illustrates an exemplary vehicle 100, and FIG. 2 is a rear perspective view of an exemplary vehicle 100. While described herein with respect to the exemplary vehicle 100 having a rear liftgate 102, the exemplary system may take many different forms and include multiple and/or alternate components and facilities. It is to be understood that the exemplary components illustrated are not intended to be limiting, and that additional or alternative components and/or implementations may be used. For example, the vehicle 100 may be any passenger or commercial vehicle such as a car, a truck, sport-utility vehicle, a bus, train, a boat, or an airplane, and the system and method according to the present disclosure may be employed in the automated or powered operation of a variety vehicle access components, i.e. liftgates, trunks, hoods, doors, windows, etc.

With further reference to FIG. 1, an exemplary vehicle 100 includes a vehicle computing device or computer 105 that generally includes a processor and a memory, the memory including one or more forms of computer-readable media, and storing instructions executable by the processor for performing various operations, including as disclosed herein. The computer 105 may include more than one computing device, e.g., controllers or the like included in the vehicle 100 for monitoring and/or controlling various vehicle components, e.g., a controller module 106, an engine control unit (ECU), transmission control unit (TCU), etc.

For example, one or both of the computer 105 and the controller module 106 may control a rear liftgate actuator 107, a powered mechanism operable to actuate the rear liftgate 102 from one of a closed position and open position (illustrated in phantom in FIG. 2) to the other. The computer 105 of the vehicle 100 receives information, e.g., collected data, from one or more data collectors 110 related to various components or conditions of the vehicle 100, e.g., components such as proximity sensor systems, camera systems, electronic power systems, etc., and/or conditions such as vehicle 100 vehicle gear, torque demand, speed, acceleration, pitch, yaw, roll, etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Data collectors 110 may include a variety of devices. For example, various controllers in the vehicle 100 may operate as data collectors 110 to provide data 115 via the CAN bus, e.g., data 115 relating to the proximity of objects or users to the vehicle 100, image data around the vehicle 100, etc. For example, data collectors 110 may include a wireless key fob sensor 111 and an infrared beam sensor 112, which may respectively generate a signal upon a particular proximity of a wireless key fob to the vehicle 100 or the intersection of an object or user with an infrared beam emitted from the vehicle 100. In another example, mechanisms such as RADAR, LADAR, sonar, etc. sensors, e.g. sonar sensor 113 of the vehicle 100, may be included for measuring a distance between the vehicle 100 and other vehicles, users and objects. Data collectors 110 may also include one or more imaging devices for gathering image data among data 115, such as a rear camera 114 of the vehicle 100. Further, sensors or the like, global positioning system (GPS) equipment, etc., could be included in a vehicle and configured as data collectors 110 to provide data directly to the computer 105, e.g., via a wired or wireless connection. Data collectors 110 could include communication devices to send and receive information from other vehicles, such as path intentions from vehicles surrounding vehicle 100. Yet other data collectors 110 could include accelerometer sensors. In addition, data collectors 110 may include sensors to detect a position, change in position, rate of change in position, etc., of vehicle 100 components such as a steering wheel, brake pedal, accelerator, gearshift lever, etc.

A memory of the computer 105 generally stores collected data 115. Collected data 115 may include a variety of data collected in a vehicle 100. Examples of collected data 115 are provided above, and moreover, data 115 is generally collected using one or more data collectors 110, and may additionally include data calculated therefrom in the computer 105 According to the principles of the present disclosure, collected data 115 for the vehicle 100 may include a user proximity signal generated by one or more of the wireless key fob sensor 111, the infrared beam sensor 112, and the sonar sensor 113 as well as object image data from the rear camera 114. In general, collected data 115 may further include any data that may be gathered by a collection device 110 and/or computed from such data. As such, collected data 115 may include a variety of data related to the proximity of users and objects to the vehicle 100, including image data of any such users and objects. Furthermore, collected data 115 could include a variety of data related to vehicle 100 operations and/or performance, data received from another vehicle, as well as data related to environmental conditions, road conditions, etc. relating to the vehicle 100. In other examples, collected data 115 could include data concerning a vehicle 100 torque demand, position, speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 100. These parameters may vary due to a particular user of the vehicle 100, an environmental condition, road condition, vehicle 100 condition, or the like. For example, stored parameters 116 may include those identifying a rear liftgate operating region 160 around the liftgate 102, a gesture path 170 in which an imaging device collects image data for the detection of an activating gesture, and activating gesture parameters for comparison to the collected image data.

Generally included in instructions stored in and executed by the computer 105 may be one or more controllers, e.g. the controller module 106. Using data received in the computer 105, e.g., collected data 115 from data collectors 110, data included as stored parameters 116, etc., the module 106 may control various vehicle 100 systems or equipment. For example, the module 106 may be used to activate and control the rear camera system 114 of the vehicle 100, such as, according to the principles of the present disclosure, when vehicle 100 is parked or the engine is powered off, a user is detected near the rear liftgate 102 of the vehicle 100 by a proximity sensing system of the vehicle 100. In another example, the controller module 106 may also be used to control a vehicle access component, e.g. the rear liftgate 102 via operation of the rear liftgate actuator 107, as discussed in further detail below.

According to the principles of the present disclosure, the computer 105 and/or controller module 106 may identify a user of vehicle 100 near a selectively power-operated vehicle access component and, upon detection of an activating gesture by the user, activate and control the access component, e.g. from one of an open and closed position to the other. For example, in the exemplary vehicle 100, the computer 105 may receive a user proximity signal as collected data 115 from one of the user proximity sensing systems, e.g. the wireless key fob sensor 111, the infrared beam 112, and/or the sonar sensor 113. The rear liftgate operating region 160 may be defined among the stored parameters 116, and the computer 105 may determine that the user proximity signal corresponds to a location within the operating region 160 near the corresponding vehicle access component, i.e., for the exemplary vehicle 100, that a user is near the rear liftgate 102.

With a user identified within the operating region 160, one or both of the computer 105 and the controller module 106 may active the rear camera 114. The computer 105 may compare image data from the rear camera 114 among the collected data 115 to a stored gesture path 170 defined among stored parameters 116. Upon identification of an object in the stored gesture path 170, the computer 105 compares object image data to stored activating gesture parameters of the stored parameters 116. For the exemplary gesture path 170 illustrated in FIG. 2, the stored activating gesture parameters may correspond, e.g., to image data of a foot swinging in a kicking motion through the stored gesture path 170. In this example, the stored activating gesture parameters may correspond to data processed from images of objects/gestures in the stored gesture path 170 for a range of speeds for kicking motions; a range of sizes of feet; the shape/configuration of a foot, ankle, and lower leg; and a general direction defined for a gesture intended to activate the system. The relatively larger number of types of data in comparison to, e.g., a binary sensor such as an infrared beam sensor, may provide, according to the principles of the present disclosure, a robust system that may avoid false triggers by object, animals, or unintentional gestures in the gesture path, while accommodating variation in the size of users' feet, preferred kicking motion, height, mobility, etc. It should be understood that a system according to the principles of the present disclosure may be configured for other activating gestures, e.g. hand waving. Moreover, in some embodiments, where imaging devices, such as the rear camera 114 of the vehicle 100, may operable to automatically clean their lens, stored parameters 116 may include parameters to identify the need for a cleaning operation of the imaging device or camera—e.g. detection of debris on the lens. As such, in some embodiments, the imaging device may execute a cleaning operation to provide a minimum level of accuracy prior to collecting object image data from the gesture path 170.

In some embodiments, data such as the operating region 160, the stored gesture path 170, any one or more of the stored activating gesture parameters among stored parameters 116 may be updated or calibrated, e.g. on a per-vehicle, per-access component, and/or per-user basis. For example, different vehicle users may be able to set up, in the computer 105, individual wireless key fobs. Thereafter, the computer 105 may be set in calibration mode, in which the rear camera 114 is activated to collect image data which the user is demonstrating as intended activating gestures. This image data may be processed to update the stored activating gesture parameters according to the user's characteristics and/or preferences—e.g., for an activating gesture in the form of a kicking motion, the stored activating gesture parameters may be calibrated and/or updated per users' foot size, mobility, preferred kicking speed, etc. In some embodiments, multiple access components of a single vehicle may be separately gesture-controlled, the respective gestures may be of different types, and each may be respectively calibrated. Furthermore, in some embodiments, where imaging devices, such as the rear camera 114 of the vehicle 100, may operable to automatically clean their lens, calibration of the activating gesture parameters may include execution of the cleaning operation for the imaging device or camera, to enable relatively accurate operation of the imaging device.

In general, computing systems and/or devices, such as the computer 105 and/or controller module 106 of the vehicle 100, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a vehicle computer or control unit, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
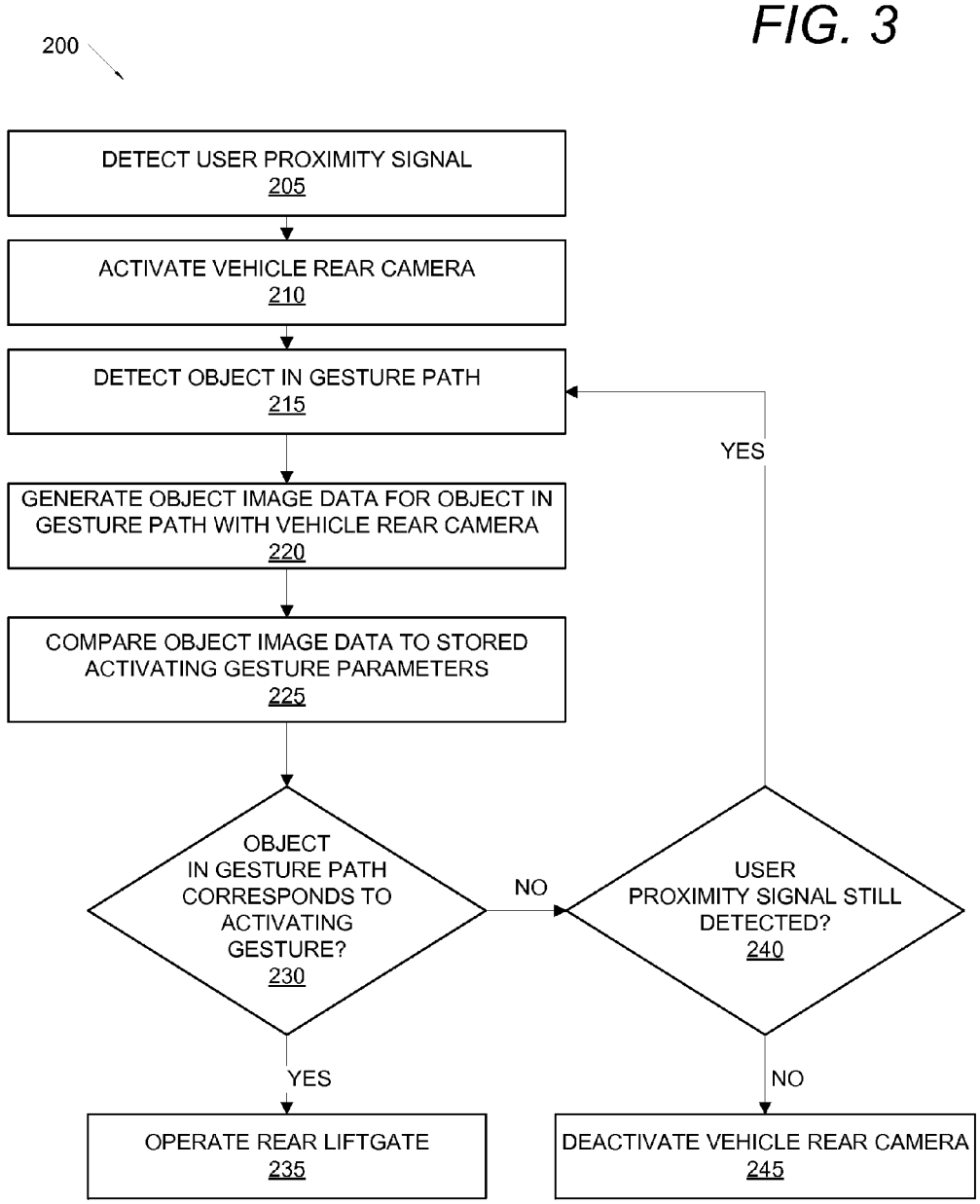
FIG. 3 is a flowchart of one exemplary process that may be implemented by the vehicle system.

FIG. 3 is a flowchart of an exemplary process 200 that may be implemented by the computer 105 and/or controller module 106 of the vehicle 100 to automatically control the rear liftgate 102 of the vehicle 100.

At block 205, the computer 105 may receive a user proximity signal in the form of collected data 115 from one or more data collectors 110, indicating that a user is within the operating region 160 at the rear of the vehicle 100 of one or more designated user proximity sensing systems among the data collectors 110. For example, the vehicle 100 may include one or more wireless key fob sensors 111 operating over the region 160. Upon entry of a user with a wireless key fob of the vehicle 100 into the region 160, the sensors 111 generate the user proximity signal. According to that collected data 115, at block 210, one or both of the computer 105 and the controller 106 may activate the rear camera 114. With wireless key fob sensors typically consuming less power than a camera system, the rear camera 114 is utilized in the system and method according to principles of the present disclosure without having to constantly power the rear camera 114 in active mode, even when vehicle 100 is off.

At a block 215, with a user detected in the proximity of the rear liftgate 102, i.e. in the region 160 at the rear of the vehicle 100, and the rear camera 114 activated, the rear camera 114 may detect an object entering a stored gesture path 170. At a block 220, upon entry of an object in the gesture path 170, the rear camera 114 collects object image data as collected data 115 for an object in the gesture path 170 and transmits that collected data 115 to the computer 105. At a block 225, the computer 105 compares the object image data of the collected data 115 to stored activating gesture parameters among the stored parameters 116.

At a block 230, if the computer 105 determines, by the comparison of the object image data of the collected data 115 to stored activating gesture parameters among the stored parameters 116, that the object in the gesture path 170 corresponds to an intended activating gesture by the user, then, at a block 235, one or both of the computer 105 and the controller 106 activate and operate the rear liftgate actuator 107, to automatically operate the rear liftgate 102 from one of a closed and open position to the other.

At a block 240, if the computer 105 determines, by the comparison of the object image data of the collected data 115 to stored activating gesture parameters among the stored parameters 116, that the object in the gesture path 170 does not correspond to an intended activating gesture by the user, the computer updates the user proximity signal. If the user remains in the proximity of the rear liftgate 102, i.e. in the region 160 at the rear of the vehicle 100, the rear camera 114 remains activated and the process 200 returns to the block 215. If the user is no longer in the region 160 at the rear of the vehicle 100, the rear camera 114 is deactivated and the process 200 ends. In some embodiments, a process according to the principles of the present disclosure further includes a calibration sequence by which any one or more of the operating region 160, the stored gesture path 170, any one or more of the stored activating gesture parameters among stored parameters 116 are updated or calibrated, e.g. on a per-vehicle, per-access component, and/or per-user basis, as well as cleaning the lens of the imaging device or camera prior to object detection in the gesture path 170 and/or prior to calibration.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising a computer in a vehicle, the computer comprising a processor and a memory, wherein the computer is configured to:
   determine that a user is located within an operating region about an access component of the vehicle;
   collect image data of an object in a gesture path for the access component;
   compare the object image data to activating gesture parameters, the activating gesture parameters including at least one of a range of gesture dynamic characteristics and a range of user characteristics, the activating gesture parameters defining a plurality of activating user gestures; and
   operate an actuator to move the access component between open and closed positions when the comparison identifies that the object image data corresponds to one of the plurality of activating user gestures.

2. The vehicle system of claim 1, further comprising:
   at least one of a wireless key fob sensor, an infrared beam sensor, and a sonar sensor,
   wherein determining that the user is located within the operating region for the access component includes receiving a user proximity signal from the at least one of the wireless key fob sensor, the infrared beam sensor, and the sonar sensor.

3. The vehicle system of claim 1, wherein the computer is further configured to:
   calibrate at least one of the operating region, the gesture path, and the activating gesture parameters to a user.

4. The vehicle system of claim 1, wherein the access component is a rear liftgate of the vehicle.

5. The vehicle system of claim 4, further comprising a rear camera of the vehicle, wherein collecting image data of the object in the gesture path includes activating and operating the rear camera of the vehicle.

6. The vehicle system of claim 1, wherein the computer is further configured to:
   determine that the user has exited the operating region for the rear liftgate; and
   deactivate the rear camera.

7. The vehicle system of claim 1, wherein the activating gesture is a user kicking motion.

8. A method comprising:
   determining that a user is located within an operating region about an access component of the vehicle;
   collecting image data of an object in a gesture path for the access component;
   comparing the object image data to activating gesture parameters, the activating gesture parameters including at least one of a range of gesture dynamic characteristics and a range of user characteristics, the activating gesture parameters defining a plurality of activating user gestures; and
   operating an actuator to move the access component between open and closed positions when the comparison identifies that the object image data corresponds to one of the plurality of activating user gestures.

9. The method of claim 8, wherein determining that the user is located within the operating region for the access component includes receiving a user proximity signal from at least one of a wireless key fob sensor, an infrared beam sensor, and a sonar sensor.

10. The method of claim 8, further comprising:
    calibrating at least one of the operating region, the gesture path, and the activating gesture parameters to a user.

11. The method of claim 8, wherein the access component is a rear liftgate of the vehicle.

12. The method of claim 11, wherein collecting image data of the object in the gesture path includes activating and operating a rear camera of the vehicle.

13. The method of claim 12, further comprising:
    determining that the user has exited the operating region for the rear liftgate; and
    deactivating the rear camera.

14. The method of claim 12, further comprising:
    cleaning the rear camera.

15. A non-transitory computer-readable medium tangibly embodying computer-executable instructions that cause a processor to execute operations comprising:
    determining that a user is located within an operating region about an access component of the vehicle;
    collecting image data of an object in a gesture path for the access component;
    comparing the object image data to activating gesture parameters, the activating gesture parameters including at least one of a range of gesture dynamic characteristics and a range of user characteristics, the activating gesture parameters defining a plurality of activating user gestures; and operating an actuator to move the access component between open and closed positions when the comparison identifies that the object image data corresponds to one of the plurality of activating user gestures.

16. The non-transitory computer-readable medium of claim 15, wherein determining that the user is located within the operating region for the access component includes receiving a user proximity signal from at least one of a wireless key fob sensor, an infrared beam sensor, and a sonar sensor.

17. The non-transitory computer-readable medium of claim 15, tangibly embodying computer-executable instructions that cause a processor to execute operations further comprising:
  calibrating at least one of the operating region, the gesture path, and the activating gesture parameters to a user.

18. The non-transitory computer-readable medium of claim 17, wherein collecting image data of the object in the gesture path includes activating and operating a camera of the vehicle.

19. The non-transitory computer-readable medium of claim 18, tangibly embodying computer-executable instructions that cause a processor to execute operations further comprising:
  determining that the user has exited the operating region; and
  deactivating the camera.

\* \* \* \* \*